(12) United States Patent
Osaka (10) Patent No.: US 10,656,655 B2
(45) Date of Patent: May 19, 2020

(54) SELF-TRAVELING VEHICLE SYSTEM, SELF-TRAVELING VEHICLE, AND METHOD FOR CONTROLLING TRAVEL OF SELF-TRAVELING VEHICLE

(71) Applicant: KYOCERA Document Solutions Inc., Osaka (JP)

(72) Inventor: Haruya Osaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 131 days.

(21) Appl. No.: 15/881,846

(22) Filed: Jan. 29, 2018

(65) Prior Publication Data

US 2018/0217606 A1   Aug. 2, 2018

(30) Foreign Application Priority Data

Jan. 31, 2017   (JP) .................................. 2017-016354

(51) Int. Cl.
*G05D 1/02*   (2020.01)
*G05D 1/00*   (2006.01)

(52) U.S. Cl.
CPC ......... *G05D 1/0244* (2013.01); *G05D 1/0088* (2013.01); *G05D 2201/0216* (2013.01)

(58) Field of Classification Search
None
See application file for complete search history.

(56) References Cited

U.S. PATENT DOCUMENTS

| | | | | |
|---|---|---|---|---|
| 4,566,032 A | * | 1/1986 | Hirooka | B66F 9/063 180/168 |
| 5,961,559 A | * | 10/1999 | Shimbara | B60L 7/006 701/23 |
| 6,249,724 B1 | * | 6/2001 | McCrary | G08G 1/22 701/24 |
| 2008/0027599 A1 | * | 1/2008 | Logan | G05D 1/0234 701/23 |
| 2009/0063052 A1 | * | 3/2009 | Onishi | G05D 1/0265 701/301 |

(Continued)

FOREIGN PATENT DOCUMENTS

DE   19516371 A1 * 11/1996   ............. B60L 15/00
JP   2015-103049 A   6/2015

*Primary Examiner* — Christian Chace
*Assistant Examiner* — Amelia J. I. Vorce
(74) *Attorney, Agent, or Firm* — Studebaker & Brackett PC (57) ABSTRACT

A self-traveling vehicle of the present disclosure includes a controller. Every time a marker sensor detects a command marker during travel of the self-traveling vehicle, the controller reads from storage a command of a command group among a plurality of command groups, and executes content of the read command. Commands of the command group are read and executed sequentially upon detection of respective command markers. When another marker sensor detects a reset marker, the controller selects another command group next to a currently executed command group in execution order, and every time the marker sensor detects a command marker, reads from the storage a command of the selected command group and executes content of the read command. Commands of the selected command group are read and executed sequentially upon detection of respective command markers.

5 Claims, 7 Drawing Sheets

(56) References Cited

U.S. PATENT DOCUMENTS

| | | | | |
|---|---|---|---|---|
| 2011/0153135 A1* | 6/2011 | Kondo | ............... | G05D 1/0261 701/23 |
| 2012/0143427 A1* | 6/2012 | Hoffman | ............. | G06Q 10/087 701/23 |
| 2012/0191272 A1* | 7/2012 | Andersen | ............ | G06Q 10/087 701/2 |
| 2013/0302132 A1* | 11/2013 | D'Andrea | ............ | G06Q 10/08 414/807 |
| 2013/0332008 A1* | 12/2013 | Herman | ............... | B64F 1/32 701/2 |
| 2014/0058556 A1* | 2/2014 | Kawano | .............. | G05D 1/0234 700/216 |
| 2017/0017224 A1* | 1/2017 | Skaggs | ................ | G05B 19/19 |

* cited by examiner

FIG. 1

| Commands used to turn left | |
|---|---|
| Command | Content of command |
| 00 | Proceed leftward |
| 02 | Turn left and stop at command marker |
| 04 | Turn left and ignore command marker |
| 06 | Travel along gentle left curve |
| ⋮ | ⋮ |

| Commands used to turn right | |
|---|---|
| Command | Content of command |
| 01 | Proceed rightward |
| 03 | Turn right and stop at command marker |
| 05 | Turn right and ignore command marker |
| 07 | Travel along gentle right curve |
| ⋮ | ⋮ |

| Commands used to travel straight | |
|---|---|
| Command | Content of command |
| 10 | Keep going straight |
| 11 | Slow down |
| 12 | Restore speed |
| 13 | Speed up |

| Commands used to stop | |
|---|---|
| Command | Content of command |
| 15 | Wireless communication |

| Commands used to turn around | |
|---|---|
| Command | Content of command |
| 20 | Turn counterclockwise and go straight |
| 21 | Turn clockwise |

| Commands used to switch sensor between effective and ineffective | |
|---|---|
| Command | Content of command |
| 30 | Effective |
| 31 | Ineffective |

FIG. 2A

First row address ; 01, 10, 11, ······

Second row address ; 00, 10, 13, ······

Third row address ; 10, 13, 31, ······

SELF-TRAVELING VEHICLE SYSTEM, SELF-TRAVELING VEHICLE, AND METHOD FOR CONTROLLING TRAVEL OF SELF-TRAVELING VEHICLE

INCORPORATION BY REFERENCE

The present application claims priority under 35 U.S.C. § 119 to Japanese Patent Application No. 2017-016354, filed on Jan. 31, 2017. The contents of this application are incorporated herein by reference in their entirety.

BACKGROUND

The present disclosure relates to: a self-traveling vehicle system for causing a self-traveling vehicle to travel along a travel line provided on a road surface; a self-traveling vehicle; and a method for controlling travel of a self-traveling vehicle. Particularly, the present disclosure relates to a technique for controlling travel of a self-traveling vehicle through detection of markers provided along a travel line.

A technique is for example disclosed in which a guide line is provided on a road surface and markers are provided along the guide line. In the technique, the guide line and the markers are detected by a plurality of reflective optical sensors provided in a carrier to cause a moving body to travel along the guide line and execute commands corresponding to the markers.

SUMMARY

A self-traveling vehicle system according to an aspect of the present disclosure includes: a travel line provided on a road surface; command markers and a reset marker each provided along the travel line; and a self-traveling vehicle that travels along the travel line. The self-traveling vehicle includes: a driving section that causes the self-traveling vehicle to travel; two marker sensors, one of the marker sensors detecting the command markers and the other of the marker sensors detecting the reset marker; storage storing therein a plurality of command groups each including a plurality of commands arranged sequentially, content of each command included in each of the plurality of command groups, and execution order of the plurality of command groups; and a controller that controls the driving section on the basis of detection output of the marker sensors. Every time the one marker sensor detects one of the command markers during travel of the self-traveling vehicle along the travel line, the controller reads from the storage a command of a command group among the plurality of command groups, reads content of the read command from the storage, and executes the content of the read command. Commands of the command group are read and executed sequentially upon detection of respective command markers. When the other marker sensor detects the reset marker, the controller selects another command group next to a currently executed command group among the plurality of command groups in the execution order. Every time the one marker sensor detects one of the command markers after the detection of the reset marker by the other marker sensor, the controller reads from the storage a command of the selected command group and executes content of the read command. Commands of the selected command group are read and executed sequentially upon detection of respective command markers.

A self-traveling vehicle according to another aspect of the present disclosure travels along a travel line provided on a road surface. The self-traveling vehicle includes: a driving section that causes the self-traveling vehicle to travel; two marker sensors, one of the marker sensors detecting command markers provided along the travel line and the other of the marker sensors detecting a reset marker provided along the travel line; storage storing therein a plurality of command groups each including a plurality of commands arranged sequentially, content of each command included in each of the plurality of command groups, and execution order of the plurality of command groups; and a controller that controls the driving section on the basis of detection output of the marker sensors. Every time the one marker sensor detects one of the command markers during travel of the self-traveling vehicle along the travel line, the controller reads from the storage a command of a command group among the plurality of command groups, reads content of the read command from the storage, and executes the content of the read command. Commands of the command group are read and executed sequentially upon detection of respective command markers. When the other marker sensor detects the reset marker, the controller selects another command group next to a currently executed command group among the plurality of command groups in the execution order. Every time the one marker sensor detects one of the command markers after the detection of the reset marker by the other marker sensor, the controller reads from the storage a command of the selected command group and executes content of the read command. Commands of the selected command group are read and executed sequentially upon detection of respective command markers.

A method for controlling travel of a self-traveling vehicle according to still another aspect of the present disclosure is a method for controlling travel of a self-traveling vehicle that travels along a travel line provided on a road surface with use of the travel line, command markers and a reset marker each provided along the travel line, and the self-traveling vehicle. The self-traveling vehicle includes: a driving section that causes the self-traveling vehicle to travel; two marker sensors, one of the marker sensors detecting the command markers and the other of the marker sensors detecting the reset marker; storage storing therein a plurality of command groups each including a plurality of commands arranged sequentially, content of each command included in each of the plurality of command groups, and execution order of the plurality of command groups; and a controller that controls the driving section on the basis of detection output of the marker sensors. The method includes every time the one marker sensor detects one of the command markers during travel of the self-traveling vehicle along the travel line, reading from the storage a command of a command group among the plurality of command groups, reading content of the read command from the storage, and executing the content of the read command. Commands of the command group are read and executed sequentially upon detection of respective command markers. The method includes when the other marker sensor detects the reset marker, selecting another command group next to a currently executed command group among the plurality of command groups in the execution order. The method includes every time the one marker sensor detects one of the command markers after the detection of the reset marker by the other marker sensor, reading from the storage a command of the selected command group and executing content of the read command. Commands of the selected command group are read and executed sequentially upon detection of respective command markers.

DETAILED DESCRIPTION

The following describes an embodiment of the present disclosure with reference to the drawings.

Figure 1:
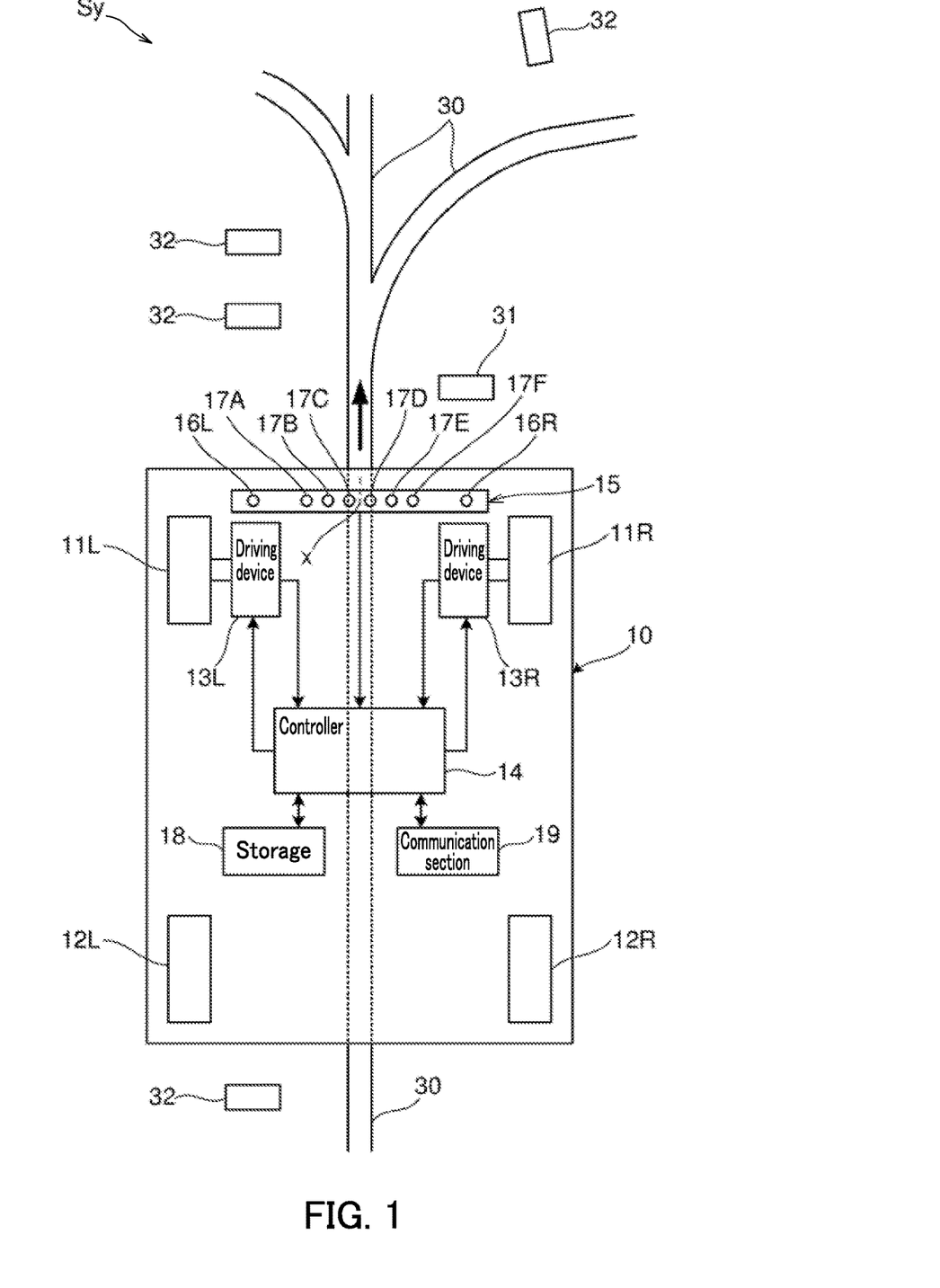
FIG. 1 is a schematic illustration of a self-traveling vehicle system according to an embodiment of the present disclosure.

FIG. 1 is a schematic illustration of a self-traveling vehicle system according to the embodiment of the present disclosure. A self-traveling vehicle system Sy illustrated in FIG. 1 includes: a self-traveling vehicle 10 that travels in a travel direction indicated by an arrow; a travel line 30 provided on a road surface; reset markers 31 provided along the travel line 30 on the right side thereof as seen in the travel direction of the self-traveling vehicle 10; and command markers 32 provided along the travel line 30 on the left side thereof as seen in the travel direction of the self-traveling vehicle 10.

The travel line 30 is a strip-like line having a substantially constant width. The reset markers 31 and the command markers 32 are each spaced apart from the center of the travel line 30 in the width direction thereof by a predetermined distance. The reset markers 31 and the command markers 32 in the present embodiment are the same in shape, size, and color, and have no pattern thereon. Note that it is not required that the reset markers 31 and the command markers 32 are the same in size. The size of the reset markers 31 and the size of the command markers 32 may differ from each other. Also, it is not required that the reset markers 31 and the command markers 32 are the same in shape. The shape of the reset markers 31 and the shape of the command markers 32 may differ from each other. The reset markers 31 are distinguished from the command markers 32 depending on which of the right side and the left side of the travel line 30 they are provided.

Note that the right side and the left side referred to in the present description are examples of one and the other of opposite sides of the travel line. When the right side is referred to as the one of the opposite sides, the left side is referred to as the other of the opposite sides, and vice versa.

The self-traveling vehicle 10 includes a pair of right and left driving wheels 11R and 11L, a pair of right and left driven wheels 12R and 12L, driving devices 13R and 13L that rotationally drive the driving wheels 11R and 11L respectively, a controller 14 that controls the driving devices 13R and 13L, an optical detector 15, storage 18, and a communication section 19.

The driving devices 13R and 13L each include a drive motor, gears, and the like. The driving devices 13R and 13L transmit rotational driving force from the respective drive motors to the driving wheels 11R and 11L, respectively, to rotationally drive the driving wheels 11R and 11L. Further, the driving devices 13R and 13L detect rotational speeds of the driving wheels 11R and 11L, respectively, and output the detected rotational speeds to the controller 14. A combination of the driving devices 13R and 13L and the driving wheels 11R and 11L referred to in the present description is an example of a driving section.

The controller 14 performs drive control on the driving devices 13R and 13L and the driving wheels 11R and 11L on the basis of detection output of travel line sensors 17A to 17F and marker sensors 16R and 16L. The controller 14 receives the rotational speeds of the driving wheels 11R and 11L from the driving devices 13R and 13L, and controls the rotational speeds of the driving wheels 11R and 11L to respective target values through control on the driving devices 13R and 13L. The controller 14 controls the rotational speeds of the driving wheels 11R and 11L to the same value to cause the self-traveling vehicle 10 to travel straight. The controller 14 controls the rotational speed of the right driving wheel 11R to be slower than that of the left driving wheel 11L to change the travel direction of the self-traveling vehicle 10 rightward. Similarly, the controller 14 controls the rotational speed of the left driving wheel 11L to be slower than that of the right driving wheel 11R to change the travel direction of the self-traveling vehicle 10 leftward. Note that the rotational speed of the driving wheel 11R and the rotational speed of the driving wheel 11L can be made different from each other by increasing the rotational speed of either one of the driving wheels 11R and 11L. It is further effective to increase the rotational speed of one of the driving wheels 11R and 11L and reduce the rotational speed of the other of the driving wheels 11R and 11L.

The storage 18 is a rewritable electrically erasable programmable read-only memory (EEPROM) and stores a plurality of command groups in respective memory areas (for example, at respective row addresses) thereof. That is, the storage 18 stores therein content of each command included in each command group and execution order in which the command groups are executed. The command groups each include a plurality of commands arranged sequentially. The commands are executed in the arranged order in the present embodiment.

The communication section 19 transmits and receives data to and from the outside through wireless communication, optical communication, or the like. The communication section 19 for example receives from the outside a travel start instruction signal that indicates start of travel of the self-traveling vehicle 10.

The optical detector 15 detects the travel line 30, the reset markers 31, and the command markers 32. The six travel line sensors 17A to 17F are arranged in the optical detector 15 in a direction perpendicular to the travel direction of the self-traveling vehicle 10 over a length longer than the width of the travel line 30. The optical detector 15 is arranged such that a center position x of the travel line sensors 17A to 17F substantially coincides with the center of the self-traveling vehicle 10 in the width direction thereof. The travel line sensors 17A to 17F are each a reflective optical sensor that detects the travel line 30. The number of the travel line sensors 17A to 17F is not limited to six, and may be increased or decreased as appropriate. An increase in the number of the travel line sensors results in improvement of detection accuracy of the position of the travel line 30. It is not required that the optical detector 15 is arranged such that the center position x of the optical detector 15 substantially coincides with the center of the self-traveling vehicle 10 in the width direction thereof. The optical detector 15 may be arranged such that the center position x of the optical detector 15 is substantially located directly above an edge of the travel line 30 or any position of the travel line 30 in the width direction thereof.

The marker sensors 16R and 16L are respectively located on the right and the left of the travel line sensors 17A to 17F and each spaced apart from the center position x of the travel line sensors 17A to 17F by a specific distance. The specific distance is substantially the same as a distance between the center of the travel line 30 and the center of each of the reset markers 31 and the command markers 32. The marker sensors 16R and 16L are also each a reflective optical sensor that detects the reset markers 31 and the command markers 32.

An optical reflectance of the travel line 30 is set such that a difference between the travel line 30 and the road surface in optical reflectance is sufficiently large. Therefore, a detection output level of each of the travel line sensors 17A to 17F significantly varies between when the travel line sensor receives light reflected by the travel line 30 and when the travel line sensor receives light reflected by the road surface. Accordingly, on the basis of detection output of each of the travel line sensors 17A to 17F, it can be determined which of the travel line sensors 17A to 17F is overlapping the travel line 30. That is, it can be determined to which of the travel line sensors 17A to 17F the position of the travel line 30 corresponds in the direction perpendicular to the travel direction of the self-traveling vehicle 10.

Also, optical reflectances of the reset markers 31 and the command markers 32 are set such that a difference between the road surface and each of the reset markers 31 and the command markers 32 in optical reflectance is sufficiently large. Further, when the self-traveling vehicle 10 travels along the travel line 30, the marker sensors 16R and 16L pass above the reset markers 31 and the command markers 32. Therefore, presence or absence of the reset markers 31 and the command markers 32 can be determined on the basis of detection output of the marker sensors 16R and 16L.

In order to cause the self-traveling vehicle 10 to travel straight along the travel line 30 in the self-traveling vehicle system Sy described above, the controller 14 of the self-traveling vehicle 10 adjusts the rotational speeds of the driving wheels 11R and 11L through control on the driving devices 13R and 13L on the basis of detection output of each of the travel line sensors 17A to 17F of the optical detector 15. Further, the controller 14 causes the self-traveling vehicle 10 to travel such that the center position x of the travel line sensors 17A to 17F overlaps the travel line 30. Through the above, the self-traveling vehicle 10 travels straight without deviating from the travel line 30.

Also, in order to cause the self-traveling vehicle 10 to travel along a part of the travel line 30 curved rightward, the controller 14 makes detection output of the three travel line sensors 17A to 17C of the left half (a left group) of the optical detector 15 ineffective, and adjusts the rotational speeds of the driving wheels 11R and 11L through control on the driving devices 13R and 13L on the basis of detection output of the three travel line sensors 17D to 17F of the right half (a right group) of the optical detector 15. Through the above, the controller 14 causes the self-traveling vehicle 10 to turn right along the part of the travel line 30 curved rightward. Similarly, in order to cause the self-traveling vehicle 10 to travel along a part of the travel line 30 curved leftward, the controller 14 makes detection output of the three travel line sensors 17D to 17F of the right half (the right group) of the optical detector 15 ineffective, and adjusts the rotational speeds of the driving wheels 11R and 11L through control on the driving devices 13R and 13L on the basis of detection output of the three travel line sensors 17A to 17C of the left half (the left group) of the optical detector 15. Through the above, the controller 14 causes the self-traveling vehicle 10 to turn left along the part of the travel line 30 curved leftward.

Further, when the marker sensor 16L of the optical detector 15 detects one of the command markers 32 during travel of the self-traveling vehicle 10, the controller 14 selects one of the plurality of command groups stored in the storage 18, reads out a command included in the selected command group, and executes content of the command. Every time the marker sensor 16L detects one of the command markers 32 in successive detection of the command markers 32, the controller 14 reads out a command that is arranged next to a previously executed command in the selected command group, and executes content of the read command.

Further, when the marker sensor 16R of the optical detector 15 detects one of the reset markers 31 and the marker sensor 16L subsequently detects one of the command markers 32, the controller 14 selects another command group that is next to a currently executed command group in the execution order among the command groups stored in the storage 18. Then, the controller 14 reads out a command that is arranged first in the selected command group, and executes content of the read command. Every time the marker sensor 16L detects one of the command markers 32 in successive detection of the command markers 32, the controller 14 reads out a command that is arranged next to a previously executed command in the selected command group, and executes content of the read command.

Thereafter, when the marker sensor 16R detects one of the reset markers 31 and the marker sensor 16L subsequently detects one of the command markers 32, the controller 14 selects another command group that is next to a currently executed command group in the execution order in a similar manner. Then, the controller 14 reads out a command that is arranged first in the selected command group, and executes content of the read command. Further, every time the marker sensor 16L detects one of the command markers 32 in successive detection of the command markers 32, the controller 14 reads out a command that is arranged next to a previously executed command in the selected command group, and executes content of the read command.

In other words, once the marker sensor 16R detects one of the reset markers 31, the controller 14 does not select another command group that is next to a currently executed command group in the execution order until the marker sensor 16R further detects one of the reset markers 31.

Further, when the marker sensors 16R and 16L simultaneously detect one of the reset markers 31 and one of the command markers 32 respectively, that is, when the self-traveling vehicle 10 reaches a position where the one of the reset markers 31 and the one of the command markers 32 are provided side by side with the travel line 30 therebetween in the direction perpendicular to the travel direction, the controller 14 stops the self-traveling vehicle 10 through control on the driving devices 13R and 13L. In addition, the controller 14 sets a command group that is the first in the execution order among the plurality of command groups as a command group to be executed next. That is, in the above situation, the one of the reset markers 31 and the one of the command markers 32 are respectively provided on the right side and the left side of the travel line 30 at the same position in the travel direction of the self-traveling vehicle 10.

Figure 2A:
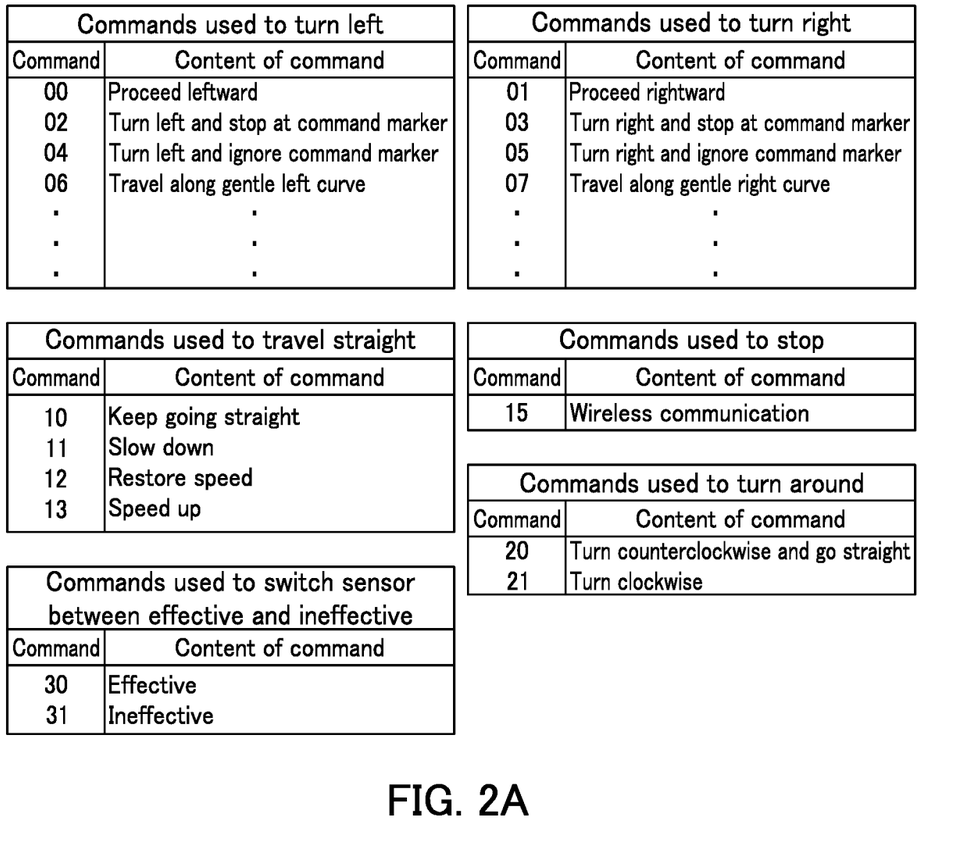
FIG. 2A is a conceptual diagram of commands and content thereof stored in storage of a self-traveling vehicle.

FIG. 2A is a conceptual diagram of commands stored in the storage 18 and content of the respective commands. FIG. 2A illustrates commands "00", "02", "04", and so on used to cause the self-traveling vehicle 10 to turn left and content of the respective commands. FIG. 2A also illustrates commands "01", "03", "05", and so on used to cause the self-traveling vehicle 10 to turn right and content of the respective commands. FIG. 2A also illustrates commands "10", "11", "12", and "13" used to cause the self-traveling vehicle 10 to travel straight, a command "15" used to stop the self-traveling vehicle 10, and content of the respective commands. FIG. 2A also illustrates commands "30" and "31" used to switch detection output of each of the travel line sensors 17A to 17F of the optical detector 15 between effective and ineffective and content of the respective commands FIG. 2A also illustrates commands "20" and "21" used to cause the self-traveling vehicle 10 to turn around and content of the respective commands.

Figure 2B:
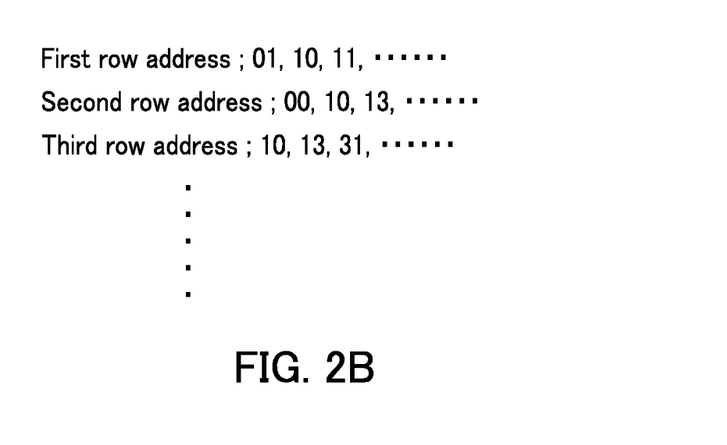
FIG. 2B is a diagram illustrating commands of respective command groups stored in the storage of the self-traveling vehicle.

FIG. 2B illustrates command groups written at respective row addresses (i.e., in respective memory areas) in the storage 18. A first command group including the commands "01", "10", "11", and so on arranged sequentially is written at the first row address. A second command group including the commands "00", "10", "13", and so on arranged sequentially is written at the second row address. Similarly, a command group including a plurality of commands arranged sequentially is written at each of the following row addresses. The order of addresses of the respective memory areas (that is, the order of the row addresses at which the respective command groups are written) indicates the execution order in the present embodiment.

Figure 3:
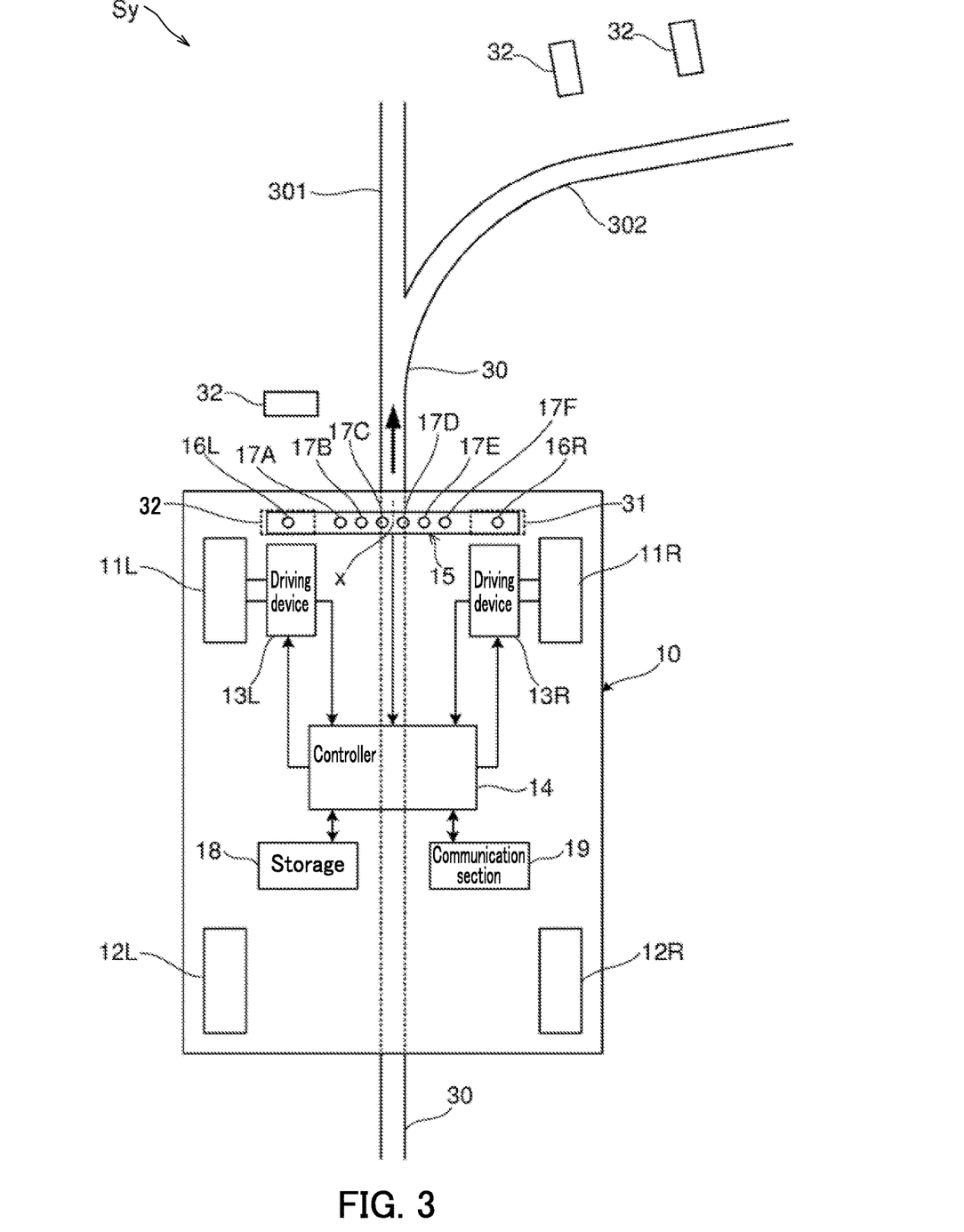
FIG. 3 is a schematic illustration of a state of travel of the self-traveling vehicle along a travel line.

When the self-traveling vehicle 10 reaches a position where a reset marker 31 and a command marker 32 are provided side by side with the travel line 30 therebetween as illustrated in FIG. 3 for example, the marker sensors 16R and 16L simultaneously detect the reset marker 31 and the command marker 32, respectively. At this time, the controller 14 stops the self-traveling vehicle 10 by stopping the driving wheels 11R and 11L through control on the driving devices 13R and 13L on the basis of detection output of the marker sensors 16R and 16L.

When the communication section 19 receives the travel start instruction signal from the outside, the controller 14 activates the driving devices 13R and 13L in response to the travel start instruction signal to start rotating the driving wheels 11R and 11L. Then, the controller 14 adjusts rotational speeds of the driving wheels 11R and 11L through control on the driving devices 13R and 13L on the basis of detection output of each of the travel line sensors 17A to 17F. Through the above, the self-traveling vehicle 10 starts traveling along the travel line 30.

When the marker sensor 16L detects a first command marker 32 after the self-traveling vehicle 10 starts traveling, the controller 14 selects the first command "01" from the command group written at the first row address on the basis of detection output of the marker sensor 16L, and executes content of the selected command "01". Here, the content of the command "01" is "proceed rightward". Therefore, the controller 14 makes detection output of the three travel line sensors 17A to 17C of the left group of the optical detector 15 ineffective (i.e., masks the travel line sensors 17A to 17C), and adjusts rotational speeds of the driving wheels 11R and 11L through control on the driving devices 13R and 13L on the basis of detection output of the three travel line sensors 17D to 17F of the right group. Through the above, the controller 14 causes the self-traveling vehicle 10 to turn right along a travel line 302 curved rightward rather than a straight travel line 301.

When the marker sensor 16L subsequently detects a second command marker 32 provided along the travel line 302 after the self-traveling vehicle 10 turns right as described above, the controller 14 selects the second command "10" from the command group written at the first row address on the basis of detection output of the marker sensor 16L. Then, the controller 14 executes content of the selected command "10". The content of the command "10" is "keep going straight". Therefore, the controller 14 adjusts rotational speeds of the driving wheels 11R and 11L through control on the driving devices 13R and 13L on the basis of detection output of the six travel line sensors 17A to 17F of the optical detector 15 as described above. Through the above, the controller 14 causes the self-traveling vehicle 10 to travel straight in a travel direction along the travel line 30.

Further, when the marker sensor 16L detects a third command marker 32, the controller 14 selects the third command "11" from the command group written at the first row address on the basis of detection output of the marker sensor 16L. Then, the controller 14 executes content of the selected command "11". The content of the command "11" is "slow down". Therefore, the controller 14 slows down the self-traveling vehicle 10 by slowing down rotational speeds of the driving wheels 11R and 11L through control on the driving devices 13R and 13L.

Thereafter, every time the marker sensor 16L detects one of the command markers 32, one of the fourth and following commands is selected from the command group written at the first row address and content of the selected command is executed in a similar manner. The fourth and following commands are selected and executed sequentially upon detection of respective command markers 32.

When the marker sensor 16R detects one of the reset markers 31 and the marker sensor 16L subsequently detects one of the command markers 32, the controller 14 performs target shift from the first row address to the second row address, selects the first command "00" from the second command group written at the second row address, and executes content of the selected command "00". Every time the marker sensor 16L detects one of the command markers 32, the controller 14 selects one of the second and following commands from the second command group written at the second row address and executes content of the selected command. The second and following commands are selected and executed sequentially upon detection of respective command markers 32.

Thereafter, when the marker sensor 16R detects one of the reset markers 31 and the marker sensor 16L subsequently detects one of the command markers 32, the controller 14 performs target shift to the next row address, selects a first command from a command group written at the next row address, and executes content of the selected command in a similar manner. Every time the marker sensor 16L detects one of the command markers 32, the controller 14 selects one of second and following commands from the command group written at the next row address, and executes content of the selected command. The second and following commands are selected and executed sequentially upon detection of respective command markers 32.

When the self-traveling vehicle 10 reaches a position where a reset marker 31 and a command marker 32 are provided side by side with the travel line 30 therebetween, the marker sensors 16R and 16L simultaneously detect the reset marker 31 and the command marker 32, respectively, and the self-traveling vehicle 10 is stopped by stopping the driving wheels 11R and 11L.

As described above, every time the marker sensor 16L detects one of the command markers 32, the controller 14 selects a command of a command group written at a row address and executes content of the selected command. Commands of the command group are selected and executed sequentially upon detection of respective command markers 32. Therefore, types of content of the commands can be increased without increasing types of the command markers 32. Further, an error is unlikely to occur in detection of the markers since rectangular markers of the same color can for example be used as the command markers 32.

According to another technique, when an error occurs in detection of a command marker 32 by the marker sensor 16L during sequential selection of commands of a command group and sequential execution of content of the respective commands, execution order of the commands may be disturbed by the error in detection. When the execution order is disturbed, extra labor is necessary for correction of the execution order since the self-traveling vehicle 10 should be returned to the original course by manually driving the self-traveling vehicle 10.

However, in the present embodiment, when the marker sensor 16R detects one of the reset markers 31 and the marker sensor 16L subsequently detects one of the command markers 32, the controller 14 performs target shift to the next row address and selects the next command group written at the next row address. Right after that, content of respective commands of the next command group is executed sequentially. Therefore, even when execution order of commands of a command group is disturbed, a situation can be prevented in which the disturbance affects execution order of commands of the next command group, and the commands of the next command group can be executed in proper order. Further, occurrence of disturbance in execution order can be prevented by providing many reset markers 31 at a place where frequent occurrence of trouble is anticipated.

Further, the controller 14 performs target shift to and selection of the next row address only when not only the reset marker 31 but also the command marker 32 is detected. That is, the target shift to the next row address is performed only after the command marker 32 is detected subsequently to detection of the reset marker 31. In the above configuration, the command marker 32 may be arranged next to a plurality of reset markers 31 arranged in succession so that the target shift to the next row address is performed when the command marker 32 is detected subsequently to detection of at least one of the reset markers 31. Through the above, even when detection of the rest of the reset markers 31 other than the at least one detected reset marker 31 is failed, the target shift to the next row address can be performed as long as the command marker 32 is detected subsequently to the detection of the at least one reset marker 31.

By contrast, in a configuration in which target shift to the next row address is performed in response to detection of a reset marker 31 only, the target shift to the next row address cannot be performed when detection of the reset marker 31 is failed. Also, if a plurality of reset markers 31 are arranged in succession in consideration of possible failure in detection of the reset marker 31 in the above configuration, the target shift to the next row address is performed in response to detection of each of the reset markers 31. As a result, some row addresses are skipped or a row address as a destination of the target shift may change due to failure in detection of any of the reset markers 31.

Figure 4:
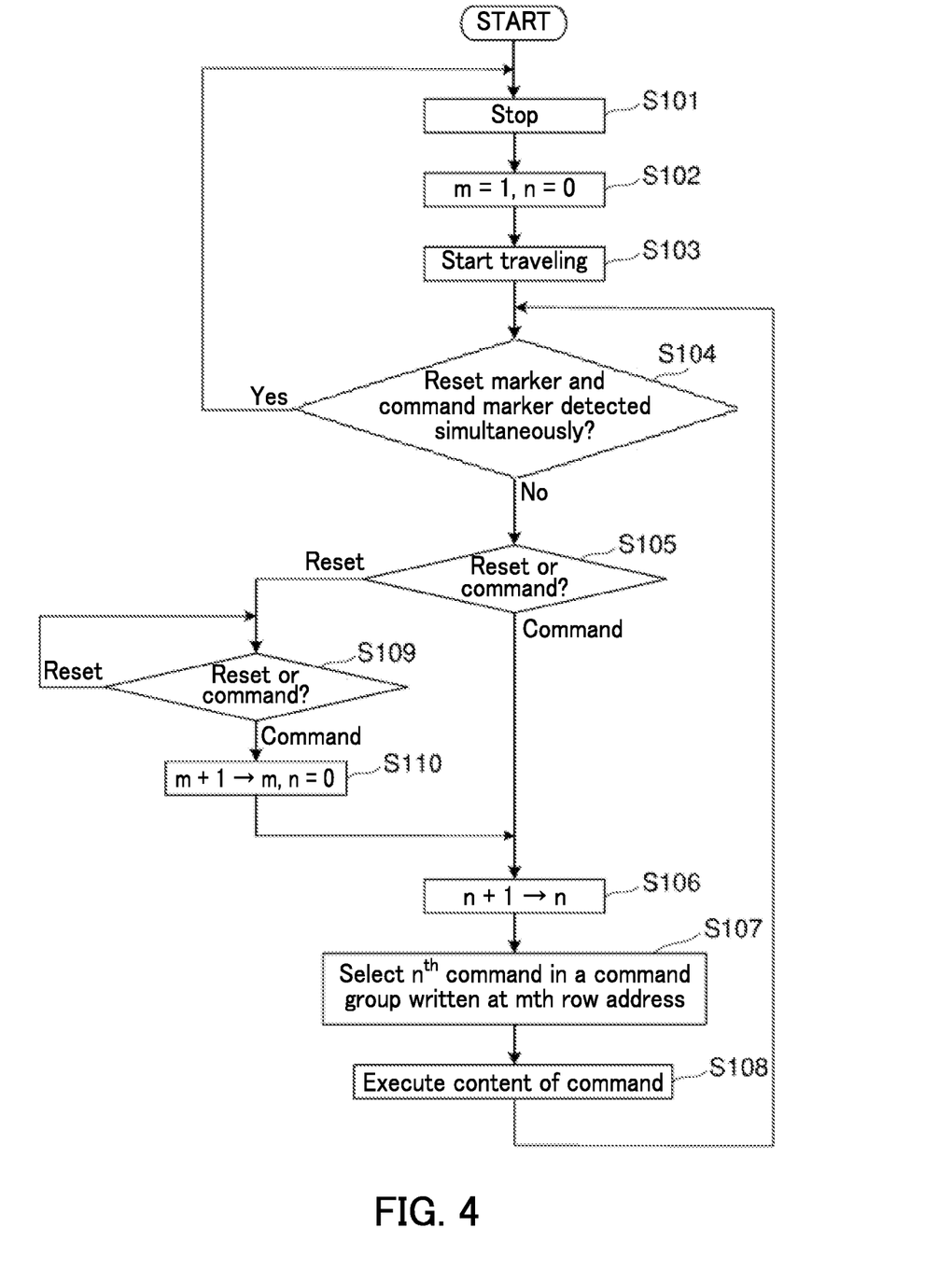
FIG. 4 is a flowchart illustrating processing for sequentially executing commands of each command group on the basis of detection of reset markers and command markers.

The following describes with reference to a flowchart of FIG. 4 processing for executing commands of each command group sequentially during travel of the self-traveling vehicle 10 along the travel line 30.

First, it is assumed that the self-traveling vehicle 10 is stopping at a position where a reset marker 31 and a command marker 32 are provided side by side with the travel line 30 therebetween (step S101). The controller 14 initializes an address index m that indicates order of a row address in the storage 18 to "1" and initializes a command index n that indicates order of a command in a command group to "0" (step S102). When the communication section 19 receives the travel start instruction signal from the outside, the controller 14 activates the driving devices 13R and 13L in response to the travel start instruction signal to start rotating the driving wheels 11R and 11L, and causes the self-traveling vehicle 10 to travel along the travel line 30 on the basis of detection output of each of the travel line sensors 17A to 17F (step S103).

During travel of the self-traveling vehicle 10, the marker sensors 16R and 16L detect reset markers 31 and command markers 32. The controller 14 determines whether or not a reset marker 31 and a command marker 32 are detected simultaneously by the marker sensors 16R and 16L (step S104). When a reset marker 31 and a command marker 32 are not detected simultaneously (No at step S104), the controller 14 determines which of the reset markers 31 and the command markers 32 is detected (step S105).

In the above-described situation, step S104 is performed right after the self-traveling vehicle 10 starts traveling from the above-described stop position. Therefore, a reset marker 31 and a command marker 32 are not detected simultaneously by the marker sensors 16R and 16L (No at step S104), and a first command marker 32 is detected ("Command" at step S105) rather than a reset marker 31. On the basis of detection output of the marker sensor 16L, the controller 14 determines that the command marker 32 is detected ("Command" at step S105). Then, the controller 14 increments the command index n by one, whereby the command index n becomes "1" (step S106). Since the address index m is "1", the controller 14 selects a first command from a command group written at the first row address (step S107), reads content of the selected command from the storage 18, and executes the content of the selected command (step S108).

Subsequently, the self-traveling vehicle 10 is kept traveling, and the processing returns to the determination as to whether or not a reset marker 31 and a command marker 32 are detected simultaneously by the marker sensors 16R and 16L (step S104) and the determination as to which of the reset markers 31 and the command markers 32 is detected (step S105). On the basis of detection output of the marker sensor 16L, the controller 14 determines that a second command marker 32 is detected ("Command" at step S105). Then, the controller 14 increments the command index n by one, whereby the command index n becomes "2" (step S106). Since the address index m is "1", the controller 14 selects a second command from the command group written at the first row address (step S107), reads content of the selected command from the storage 18, and executes the content of the selected command (step S108).

Thereafter, when it is determined on the basis of detection output of the marker sensor 16L that a next command marker 32 is detected ("Command" at step S105), the command index n is incremented by one in a similar manner (step S106). Since the address index m is "1", the controller 14 selects an $n^{th}$ command from the command group written at the first row address (step S107), reads content of the selected $n^{th}$ command from the storage 18, and executes the content of the $n^{th}$ command (step S108).

When the controller 14 determines on the basis of detection output of the marker sensor 16R that a first reset marker 31 is detected ("Reset" at step S105) during travel of the self-traveling vehicle 10, the controller 14 determines on the basis of detection output of the marker sensor 16R whether or not a second or following reset marker 31 is detected subsequently to the detection of the first reset marker 31 (step S109). Step S109 is repeated every time the second or following reset marker 31 is detected ("Reset" at step S109). Thereafter, when the marker sensor 16L detects a command marker 32, the controller 14 determines on the basis of detection output of the marker sensor 16L that a first command marker 32 is detected after the detection of the reset marker(s) 31 ("Command" at step S109), increments the address index m by one, whereby the address index m becomes "2", and restores the command index n to "0" (step S110). Therefore, in a situation in which the command marker 32 is arranged next to one or more reset markers 31, when the command marker 32 is detected subsequently to detection of at least one of the one or more reset markers 31, the address index m is incremented by one to cause target shift to the next row address in the execution order, and the command index n is restored to "0".

Then, the controller 14 increments the command index n by one, whereby the command index n becomes "1" (step S106). Since the address index m is "2", the controller 14 selects a first command from a command group written at the second row address (step S107), reads content of the selected command from the storage 18, and executes the content of the selected command (step S108).

Thereafter, every time it is determined on the basis of detection output of the marker sensor 16L that a next command marker 32 is detected ("Command" at step S105), the command index n is incremented by one in a similar manner (step S106). Since the address index m is "2", the controller 14 selects an $n^{th}$ command from the command group written at the second row address (step S107) and executes content of the $n^{th}$ command (step S108).

When the marker sensor 16R detects at least one reset marker 31 ("Reset" at steps S105 and S109) and the marker sensor 16L subsequently detects a command marker 32 ("Command" at step S109), the address index m is incremented by one and the command index n is restored to "0" (step S110). Next, the command index n is incremented by one, whereby the command index n becomes "1" (step S106). Further, a first command is selected from a command group written at the $m^{th}$ row address (step S107), and content of the selected command is executed (step S108). Thereafter, every time it is determined on the basis of detection output of the marker sensor 16L that a next command marker 32 is detected ("Command" at step S105), the command index n is incremented by one (step S106). Next, an $n^{th}$ command is selected from the command group written at the $m^{th}$ row address (step S107), and content of the $n^{th}$ command is executed (step S108).

As described above, commands of a command group written at a row address are selected sequentially and content of the respective commands is executed sequentially. Further, target shift to the next row address is performed. Then, commands of a command group written at the next row address are selected sequentially and content of the respective commands is executed sequentially. The same processing is repeated.

When the self-traveling vehicle 10 returns to the position where the reset marker 31 and the command marker 32 are provided side by side with the travel line 30 therebetween, the controller 14 determines on the basis of detection output of the marker sensors 16R and 16L that the reset marker 31 and the command marker 32 are detected simultaneously ("Yes" at step S104). Then, the controller 14 stops the self-traveling vehicle 10 by stopping the driving wheels 11R and 11L through control on the driving devices 13R and 13L (step S101).

As described above, commands and content of the respective commands are stored in the storage 18 in advance, and one of commands of a command group is selected and content of the selected command is executed every time the marker sensor 16L detects one of the command markers 32 in the present embodiment. The commands of the command group are selected and executed sequentially upon detection of respective command markers 32. Therefore, types of content of the commands can be increased without increasing types of the command markers 32.

Further, when the marker sensor 16R detects a reset marker 31 and the marker sensor 16L subsequently detects a command marker 32, the controller 14 performs target shift to the next row address and selects the next command group. Right after that, the controller 14 executes content of respective commands of the next command group sequentially. Therefore, even when execution order of commands of a command group is disturbed, a situation can be prevented in which the disturbance affects execution order of commands of the next command group.

Further, the target shift to and the selection of the next row address are performed when not only the reset marker 31 but also the command marker 32 is detected. Therefore, in a situation in which the command marker 32 is arranged next to a plurality of reset markers 31 arranged in succession, the target shift to the next row address can be performed as long as the command marker 32 is detected subsequently to detection of at least one of the reset markers 31 even when detection of reset markers 31 other than the at least one detected reset marker 31 is failed.

The travel direction of the self-traveling vehicle 10 is changed in the above-described embodiment by adjusting the rotational speeds of the driving wheels 11R and 11L through control on the driving devices 13R and 13L. However, the self-traveling vehicle 10 may include a steering wheel and the travel direction of the self-traveling vehicle 10 may be changed by turning the steering wheel.

Also, a pair of right and left caterpillars may be used instead of the driving wheels 11R and 11L, or instead of the driving wheels 11R and 11L and the driven wheels 12R and 12L.

The optical detector 15 in the above-described embodiment is located near the driving wheels 11R and 11L and the driving devices 13R and 13L. This is because the travel direction of the self-traveling vehicle 10 is changed through the driving wheels 11R and 11L and the driving devices 13R and 13L and therefore a change in the travel direction of the self-traveling vehicle 10 can be detected accurately without delay in a configuration in which the optical detector 15 is located near the driving wheels 11R and 11L and the driving devices 13R and 13L.

(i) The optical detector 15 may be provided for example in a drive unit including the driving wheels 11R and 11L and the driving devices 13R and 13L. In this configuration, the optical detector 15 moves to the right and the left in the same manner as the drive unit that performs steering. Therefore, steering control can be simplified.

(ii) Alternatively, the optical detector 15 may be coupled to the drive unit and spaced apart from the drive unit so as to be located in front of the drive unit in the travel direction of the self-traveling vehicle 10. In this configuration, a slight wobble of the drive unit in a left-and-right direction is amplified and the optical detector 15 detects the amplified wobble. As a result, travel control of the self-traveling vehicle 10 can be performed with improved accuracy.

Note that in a configuration in which the optical detector 15 is provided for example on a main body frame of the self-traveling vehicle 10 rather than in the drive unit, even if the optical detector 15 is located in front of the drive unit, the wobble of the drive unit in the left-and-right direction is detected by the optical detector 15 later than actual occurrence of the wobble in the self-traveling vehicle 10. However, through employment of either of the configurations described above in (i) and (ii), the optical detector 15 is capable of detecting the wobble in the left-and-right direction at a time close to the actual occurrence of the wobble in the self-traveling vehicle 10. Therefore, travel control of the self-traveling vehicle 10 can be performed with high accuracy in quick response to the occurrence of the wobble in the self-traveling vehicle 10.

Figure 5:
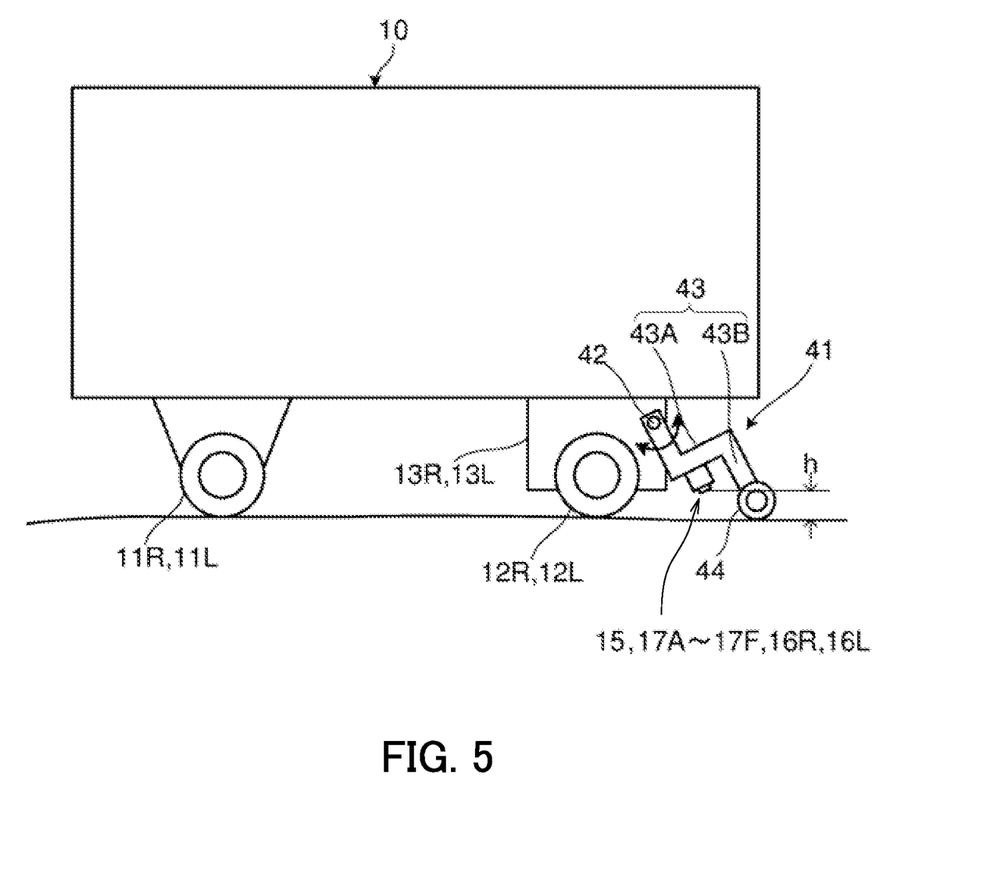
FIG. 5 is a diagram illustrating an example of a mechanism for supporting an optical detector of the self-traveling vehicle.

Further, the optical detector 15 may be swingably supported by a supporting device 41 as illustrated in FIG. 5 to keep a distance h constant. The distance h indicates a distance between the travel line and each of the travel line sensors 17A and 17F, or a distance between each marker and each of the marker sensors 16R and 16L. The supporting device 41 includes: a shaft 42 extending parallel to a housing of the driving devices 13R and 13L in the direction perpendicular to the travel direction; a swing frame 43 rotatably supported by the shaft 42; and a pair of right and left small wheels 44 attached to a lower end of the swing frame 43. The swing frame 43 includes an L-shaped arm portion 43A and a leg portion 43B extending downwards from an end of the L-shaped arm portion 43A. The shaft 42 rotatably extends through an upper end of the L-shaped arm portion 43A of the swing frame 43. The optical detector 15 is fixed to a lower surface of the L-shaped arm portion 43A. The pair of small wheels 44 is attached to a lower end of the leg portion 43B of the swing frame 43.

The swing frame 43 is supported so as to be rotatable about the shaft 42. In this configuration, the swing frame 43 is urged in the clockwise direction by empty weight of the swing frame 43 and weight of the optical detector 15 and the pair of small wheels 44. As a result, the pair of small wheels 44 is held in contact with the road surface. Therefore, the pair of small wheels 44 always rotates while in contact with the road surface irrespective of whether the road surface is flat or uneven. Further, the pair of small wheels 44 always keeps the optical detector 15 located at the constant distance h from the road surface. Through the above, the distance h between the travel line and each of the travel line sensors 17A to 17F of the optical detector 15 and the distance h between each marker and each of the marker sensors 16R and 16L are kept constant irrespective of whether the road surface is flat or uneven. As a result, stable detection of the travel line by the travel line sensors 17A and 17F and stable detection of markers by the marker sensors 16R and 16L can be performed.

If the distance h between the travel line and each of the travel line sensors 17A to 17F varies due to unevenness of the road surface, an amount of light reflected by the travel line and received by each of the travel line sensors 17A to 17F varies and may become close to an amount of light reflected by the road surface, resulting in occurrence of an error in detection of the travel line.

By contrast, in a situation in which the distance h between the travel line and each of the travel line sensors 17A to 17F is kept constant irrespective of unevenness of the road surface, the amount of light reflected by the travel line and received by each of the travel line sensors 17A to 17F does not vary, resulting in prevention of occurrence of an error in detection of the travel line.

For a similar reason, occurrence of an error in detection of markers by the marker sensors 16R and 16L can be prevented.

Figure 6:
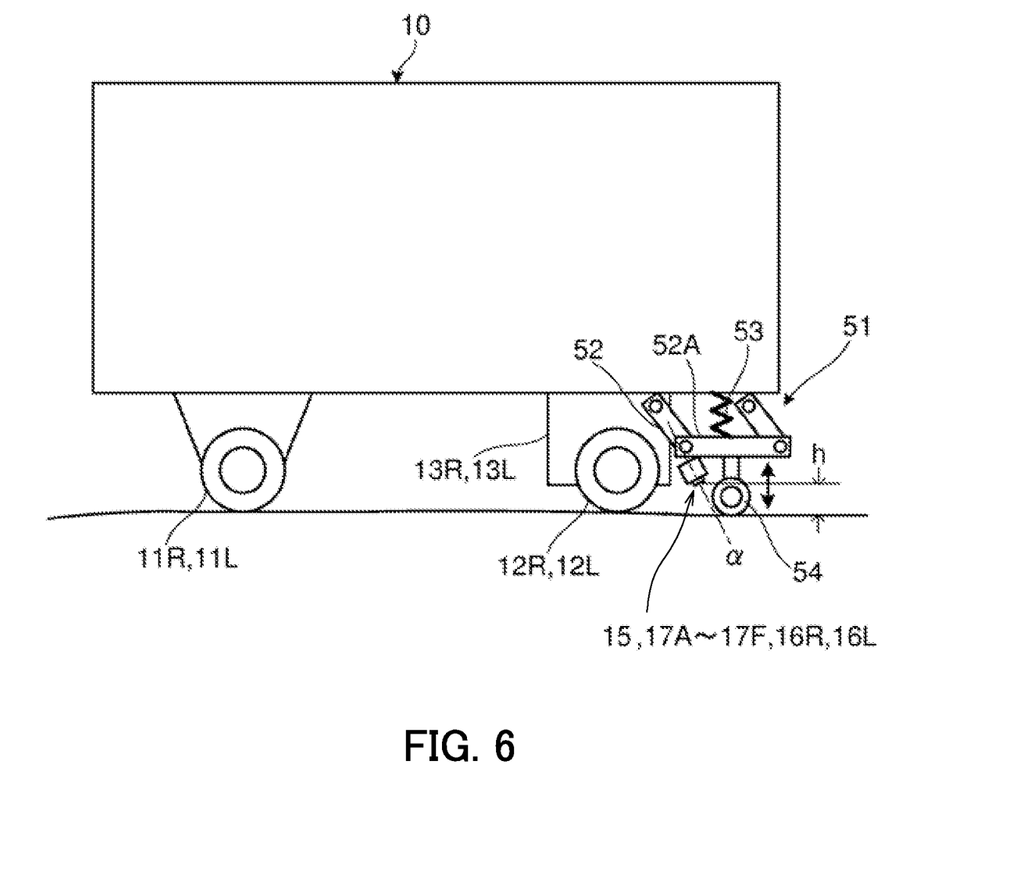
FIG. 6 is a diagram illustrating another example of the mechanism for supporting the optical detector of the self-traveling vehicle.

Alternatively, the optical detector 15 may be supported by a supporting device 51 as illustrated in FIG. 6. The supporting device 51 includes: a parallelogram link 52; a spring 53 that urges downwards a linkage member 52A constituting a lower side of a parallelogram defined by the parallelogram link 52; and a pair of right and left small wheels 54 attached to a lower surface of the linkage member 52A. The linkage member 52A of the parallelogram link 52 is supported so as to be movable in the up-and-down direction while keeping an angle relative to the road surface unchanged. The optical detector 15 is fixed to the linkage member 52A.

The spring 53 urges the linkage member 52A and the pair of small wheels 54 downwards to keep the pair of small wheels 54 in contact with the road surface. Therefore, the pair of small wheels 54 always rotates while in contact with the road surface irrespective of whether the road surface is flat or uneven. Further, the linkage member 52A moves in the up-and-down direction together with the pair of small wheels 54 while keeping an angle relative to the road surface unchanged. Also, the linkage member 52A is always kept at a constant height from the road surface by the pair of small wheels 54. Therefore, the optical detector 15 also moves in the up-and-down direction while keeping an angle relative to the road surface unchanged and being always kept at the constant distance h from the road surface. As a result of the optical detector 15 being kept at the constant distance h from the road surface, the distance h between the travel line and each of the travel line sensors 17A to 17F of the optical detector 15 and the distance h between each marker and each of the marker sensors 16R and 16L are kept constant. Also, as a result of the optical detector 15 moving in the up-and-down direction while keeping an angle relative to the road surface unchanged, an incident direction a of light reflected by the travel line and incident on each of the travel line sensors 17A to 17F and an incident direction a of light reflected by each marker and incident on each of the marker sensors 16R and 16L are kept constant. As a result, more stable detection of the travel line by the travel line sensors 17A and 17F and more stable detection of markers by the marker sensors 16R and 16L can be performed.

If the incident direction a of the light reflected by the travel line and incident on each of the travel line sensors 17A to 17F varies due to unevenness of the road surface, an amount of reflected light received by each of the travel line sensors 17A to 17F varies, resulting in occurrence of an error in detection of the travel line.

By contrast, in a situation in which the incident direction a of the light reflected by the travel line and incident on each of the travel line sensors 17A to 17F is kept constant irrespective of unevenness of the road surface, the amount of the reflected light received by each of the travel line sensors 17A to 17F does not vary. Therefore, occurrence of an error in detection of the travel line can be further prevented by not only keeping the distance h between the travel line and each of the travel line sensors 17A to 17F constant but also keeping the incident direction a of the light reflected by the travel line and incident on each of the travel line sensors 17A to 17F constant.

For a similar reason, occurrence of an error in detection of markers by the marker sensors 16R and 16L can be further prevented.

Further, in a configuration in which the supporting device 41 illustrated in FIG. 5 or the supporting device 51 illustrated in FIG. 6 is employed, the travel line sensors 17A to 17F can be held sufficiently close to the road surface or the travel line while being prevented from contacting the road surface or the travel line. Through the above, accuracy in detection of the position of the travel line by the travel line sensors 17A to 17F can be improved. Therefore, employment of the supporting device 41 or the supporting device 51 is effective for achieving sufficiently high position detection accuracy for practical implementation of magnetic detection of the travel line, which is inferior to optical detection of the travel line in position detection accuracy.

A magnetic tape is for example attached to the road surface as the travel line in the magnetic detection of the travel line. Also, a plurality of hall effect sensors for detecting the magnetic tape are attached to the self-traveling vehicle so as to be arranged in a direction intersecting the magnetic tape. On the basis of detection output of each of the hall effect sensors, it is determined to which of the hall effect sensors the position of the magnetic tape corresponds. On the basis of a result of the determination, the travel direction of the self-traveling vehicle is controlled so that the self-traveling vehicle travels along the magnetic tape.

In the above configuration, the hall effect sensors can be held sufficiently close to the road surface or the travel line while being prevented from contacting the road surface or the travel line by supporting the hall effect sensors with the supporting device 41 illustrated in FIG. 5 or the supporting device 51 illustrated in FIG. 6. As a result, the position of the travel line can be detected by the hall effect sensors with improved accuracy. Therefore, the travel line and the travel line sensors of the present disclosure can respectively encompass the magnetic tape and the hall effect sensors for detecting the magnetic tape.

Figure 7:
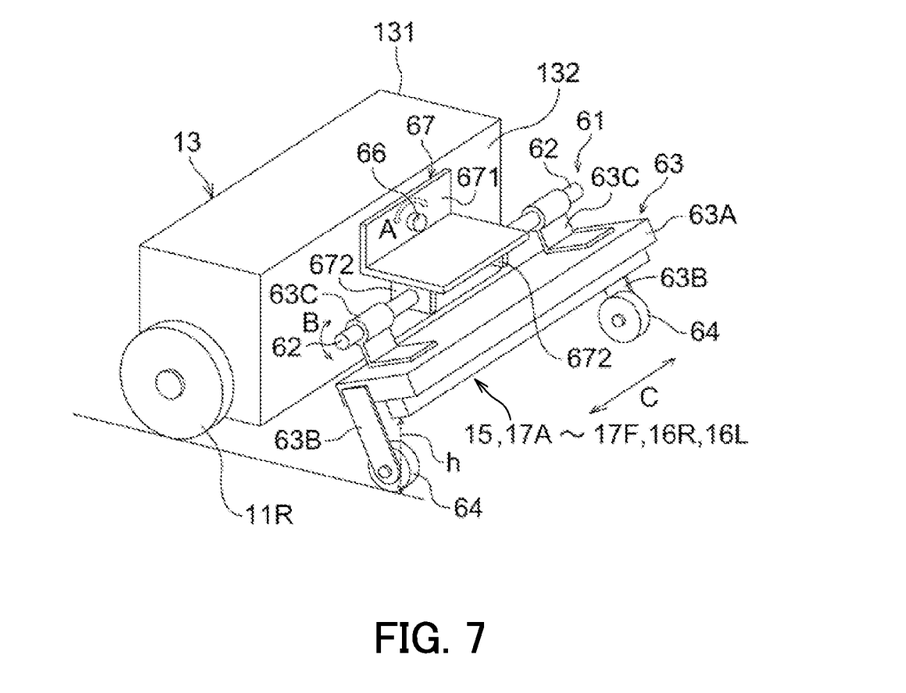
FIG. 7 is a diagram illustrating still another example of the mechanism for supporting the optical detector of the self-traveling vehicle.

Alternatively, the optical detector 15 may be supported by a supporting device 61 as illustrated in FIG. 7. In this configuration, the optical detector 15 is supported by the supporting device 61 so as to be swingable in both the travel direction of the self-traveling vehicle 10 and the direction perpendicular to the travel direction. Also, the distance h between the travel line and each of the travel line sensors 17A to 17F and the distance h between each marker and each of the marker sensors 16R and 16L are kept constant.

The supporting device 61 includes two shafts 62 extending parallel to a housing 131 of the driving devices 13R and 13L in the direction perpendicular to the travel direction; a swing frame 63 rotatably supported by the shafts 62; and a pair of right and left small wheels 64 attached to a lower end of the swing frame 63. The swing frame 63 includes a plate-like arm portion 63A, support portions 63C, and leg portions 63B extending downwards from respective opposite sides of the plate-like arm portion 63A. The support portions 63C are attached to the two respective shafts 62 so as to be rotatable about the respective shafts 62, and coupled to the plate-like arm portion 63A. The optical detector 15 is fixed to a lower surface of the plate-like arm portion 63A. The pair of small wheels 64 is rotatably attached to lower ends of the respective leg portions 63B.

Further, a rod 66 and a support portion 67 are attached to a side surface 132 of the housing 131 of the driving devices 13R and 13L. The support portion 67 is rotatable in directions indicated by an arrow A. The support portion 67 includes for example an L-shaped plate-like portion 671 and two shaft support portions 672 attached to a lower part of the plate-like portion 671. The shaft support portions 672 support the respective shafts 62 in a manner that the shafts 62 are rotatable. Note that as illustrated in FIG. 7, the arrow A indicates the directions in which the support portion 67 rotates about the rod 66 relative to the housing 131.

In the above configuration, the swing frame 63 and the small wheels 64 rotationally move about the shafts 62 in directions indicated by an arrow B and also rotationally move about the rod 66 in the directions indicated by the arrow A. Therefore, the plate-like arm portion 63A having the lower surface to which the optical detector 15 is attached rotates in the directions indicated by the arrow B in accordance with unevenness of the road surface with which the two small wheels 64 are held in contact. Through the above, a distance h between the road surface and the optical detector 15 can be kept substantially constant. Further, the plate-like arm portion 63A rotates in the directions indicated by the arrow A. Through the above, the distance h between the road surface and the optical detector 15 can be kept substantially constant even if the road surface with which the two small wheels 64 are held in contact is uneven in directions indicated by an arrow C. Note that as illustrated in FIG. 7, the arrow B indicates the directions in which the swing frame 63 and the small wheels 64 rotate about the shafts 62.

Note that the configuration and the processing in the embodiment described above with reference to FIGS. 1 to 7 are merely an embodiment of the present disclosure, and not intended as specific limitations of the present disclosure.

What is claimed is:

1. A self-traveling vehicle comprising:
a marker sensor;
storage storing command groups which contain commands which correspond to command markers; and
a controller, wherein
the controller
executes contents of a command when the marker sensor detects a command marker, and
shifts to a next command group among other command groups when the marker sensor detects at least two successive reset markers.

2. A self-traveling vehicle system comprising:
a travel line provided on a road surface;
command markers and reset markers arranged along the travel line; and
a self-traveling vehicle configured to travel along the travel line, wherein
at least two successive reset markers with no command marker therebetween among the reset markers are arranged along the travel line,
the self-traveling vehicle includes:
a marker sensor;
storage storing command groups which contain commands which correspond to the command markers; and
a controller, and
the controller executes contents of a command when the marker sensor detects a command marker, and shifts to a next command group among other command groups when the marker sensor detects at least one reset marker among the at least two successive reset markers.

3. The self-traveling vehicle system according to claim 2, wherein the marker sensor is provided as two marker sensors, the command markers are located on one of opposite sides of the travel line, and the reset markers are located on the other of the opposite sides of the travel line, and one of the marker sensors is located on the one of the opposite sides of the travel line to detect the command markers, and the other of the marker sensors is located on the other of the opposite sides of the travel line to detect the reset markers.

4. The self-traveling vehicle system according to claim 2, wherein the marker sensor is a reflective optical sensor that detects the command markers or the reset markers by receiving light reflected by the command markers or the reset markers.

5. The self-traveling vehicle system according to claim 2, wherein the self-traveling vehicle further comprises:

a linkage member that fixes the marker sensor and a travel line sensor;

a wheel that is provided for the linkage member and in contact with the road surface; and a spring that urges the linkage member toward the road surface.

* * * * *